United States Patent [19]

Paulson

[11] Patent Number: 4,991,890
[45] Date of Patent: Feb. 12, 1991

[54] RETRACTABLE BUMPER BAR

[75] Inventor: William C. Paulson, Georgetown, Canada

[73] Assignee: S.B.R. Limited, Guernsey, Channel Islands

[21] Appl. No.: 513,022

[22] Filed: Apr. 25, 1990

Related U.S. Application Data

[63] Continuation of Ser. No. 260,304, Oct. 20, 1988, abandoned.

[51] Int. Cl.$^5$ .............................................. B60R 19/38
[52] U.S. Cl. ...................................... 293/118; 293/34
[58] Field of Search ...................... 293/118, 111.1, 119, 293/102, 140, 34, 35, 36, 37, 155; 280/763.1, 764.1, 765.1, 766.1

[56] References Cited

U.S. PATENT DOCUMENTS 4,514,002  4/1985  McIntosh .............................. 293/118
4,582,351  4/1986  Edwards ............................... 293/118

FOREIGN PATENT DOCUMENTS 2426552  12/1975  Fed. Rep. of Germany ...... 293/118

Primary Examiner—Robert P. Olszewski
Assistant Examiner—Mark T. Le
Attorney, Agent, or Firm—Smart & Biggar

[57]  ABSTRACT

A bumper assembly, for use with a tailgate assembly on a motor vehicle frame, comprising: a bumper bar carrying a pair of laterally projecting, spaced arms, one end of each of the arms being fixed to the bar and the other end being pivotally mounted on the frame of the vehicle; and rigid links connected at one end with the bar and adapted to be connected at the other end with the tailgate assembly, whereby upon lowering the tailgate the bar swings out of the path of the tailgate into a position suspended beneath the frame.

6 Claims, 3 Drawing Sheets

RETRACTABLE BUMPER BAR

This application is a continuation of application Ser. No. 07/260,304, filed Oct. 20, 1988, now abandoned.

FIELD OF THE INVENTION

This invention relates to a retractable bumper for a motor vehicle.

BACKGROUND OF THE INVENTION

It is known to provide braking systems for a motor vehicle in which the bumper is actuable, on contact with an obstruction, to generate a detector signal which causes the automatic application of the vehicle's brakes. One example of such a braking system is shown in my pending U.S. Pat. application No. 070,796 filed July 7, 1987, now abandoned, entitled Motor Vehicle Braking System.

Trucks and the like using hydraulically operated tailgate systems cannot use a rear safety bumper of this type because the bumper would interfere with the operation of the tailgate system.

It is an object of the present invention to provide a bumper assembly which allows a rear bumper to be used on a motor vehicle having a tailgate assembly.

STATEMENT OF THE INVENTION

In accordance with the present invention, there is provided for use with a tailgate assembly on a motor vehicle frame, a bumper assembly comprising an elongated bar carrying a pair of arms, one end of each of the arms being fixed to the bar and the other end being pivotally mounted on the frame of the vehicle and rigid linkage means connected at one end with the bar and adapted to be connected at the other end with the tailgate assembly, whereby upon lowering the tailgate, the bar swings out of the path of the tailgate and beneath the frame.

BRIEF DESCRIPTION OF THE DRAWINGS

An example embodiment of the invention is shown in the accompanying drawings, in which.

DESCRIPTION OF PREFERRED EMBODIMENT

Figure 1:
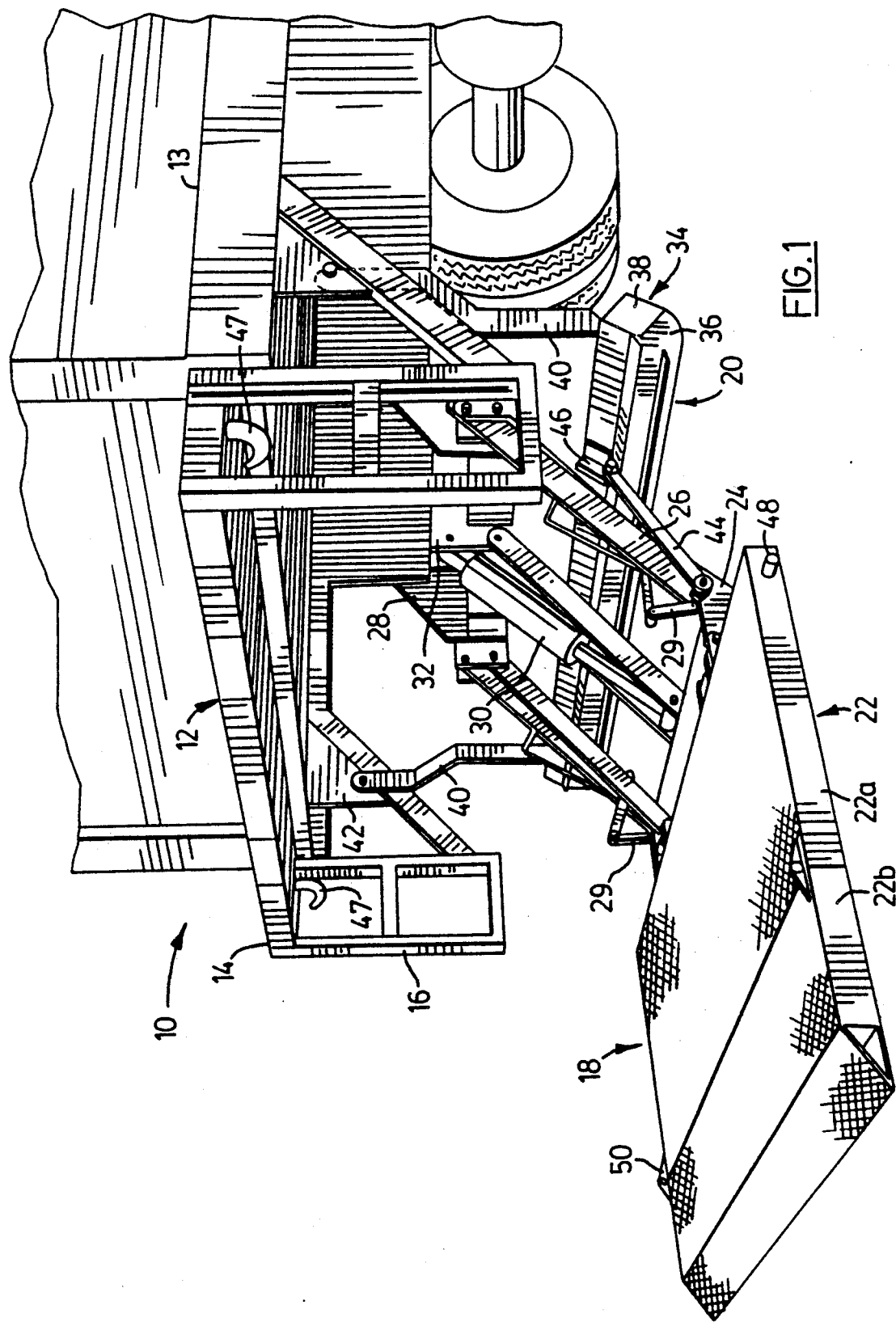
FIG. 1 is a perspective view of the rear portion of a motor vehicle carrying a tailgate and a pneumatic bumper.

The embodiment shown in FIGS. 1 to 5 of the drawings consists of a motor vehicle 10, With a body frame 12, having a flatbed 13 with a rearwardly extending sill 14 and depending side steps 16. A tailgate assembly 18 is pivotally attached to frame 12 and a bumper assembly 20 is pivotally attached to the frame and also to the tailgate assembly.

Tailgate assembly 18 comprises a platform 22 carrying a fixed bracket 24. A plurality of spaced parallel equalizer shafts 26 are each pivotally connected at one end to bracket 24 and at the other end to flanges 28 of frame 12, the two outer shafts carrying platform rests 29. An hydraulic cylinder 30 is pivotally connected at one end to a further flange 32 of frame 12 and pivotally connected at the other end in association with bracket 24 of tailgate 22.

Bumper assembly 20 includes a bumper bar 34 positioned rearwardly of frame 12. Bumper bar 34 comprises a pneumatic tube 36 fixed on a rigid backing 38. An example of such a bumper bar 34, and its function, is described in my aforementioned United States patent application. Bumper bar 34 is pivotally mounted on frame 12 of vehicle 10 by a pair of spaced, parallel laterally projecting arms 40 each fixed at one end to the bar and at the other end to a flange 42 on the frame. Arms 40 are spaced laterally outwardly from shafts 26 and angled inwardly to give proper clearance of steps 16. A pair of links 44 are each pivotally connected at one end to a bracket 46 fixed on bumper bar 34 and at the other end to bracket 24 on platform 22.

A pair of downwardly projecting safety hooks 47 are fixed to sill 14 of frame 12 adjacent steps 16. A pair of pins 48 project outwardly one from each side of platform 22 adjacent the end of the platform carrying bracket 24, positioned to be received by hooks 47 when the platform is stored. Also, platform 22 is of two sections 22a and 22b held together by hinges 50.

Figure 2:
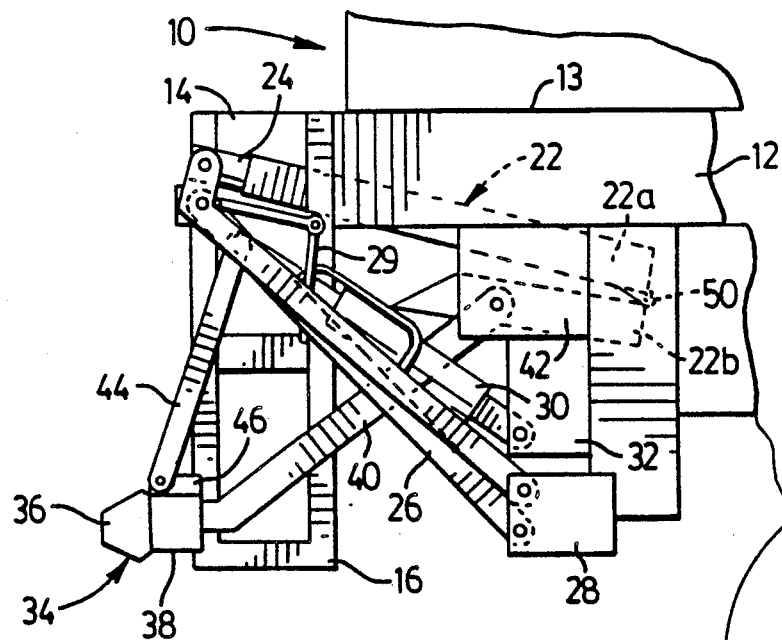
FIG. 2 is a side view, in partial cross-section, of the apparatus of FIG. 1 showing the bumper in operable position rearwardly of the motor vehicle.

In the operation of the embodiment of the invention shown in the drawings, FIG. 2 shows bumper assembly 20 in its operable position with tailgate assembly 18 stored in a folded position below sill 14. As a safeguard against damage in the event that hydraulic cylinder 30 fails when the tailgate is stored in its folded position, hooks 47 hold pins 48 to provide a safety latch.

Figure 3:
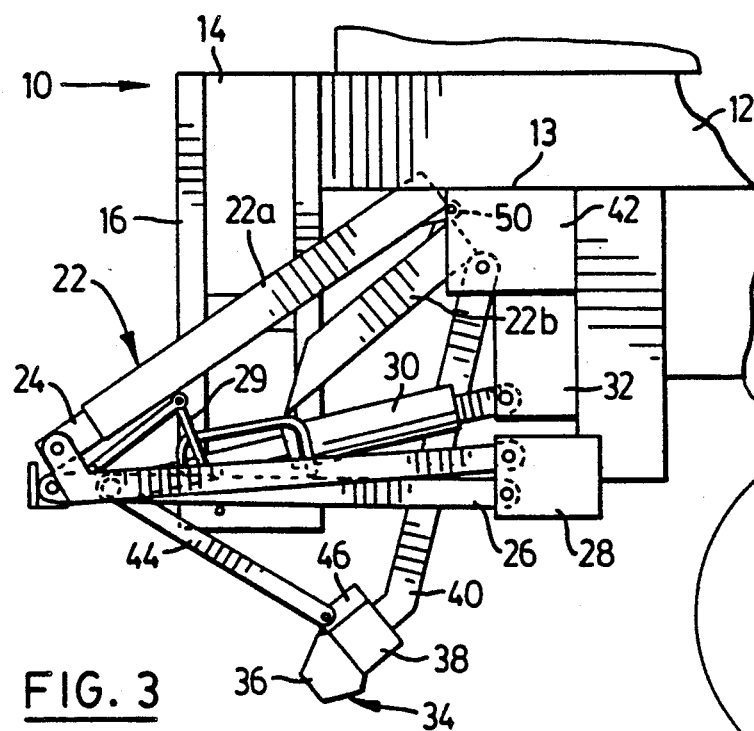
FIG. 3 is a view similar to FIG. 2 showing lowering of the tailgate and the commencement of the retraction of the bumper.
Figure 4:
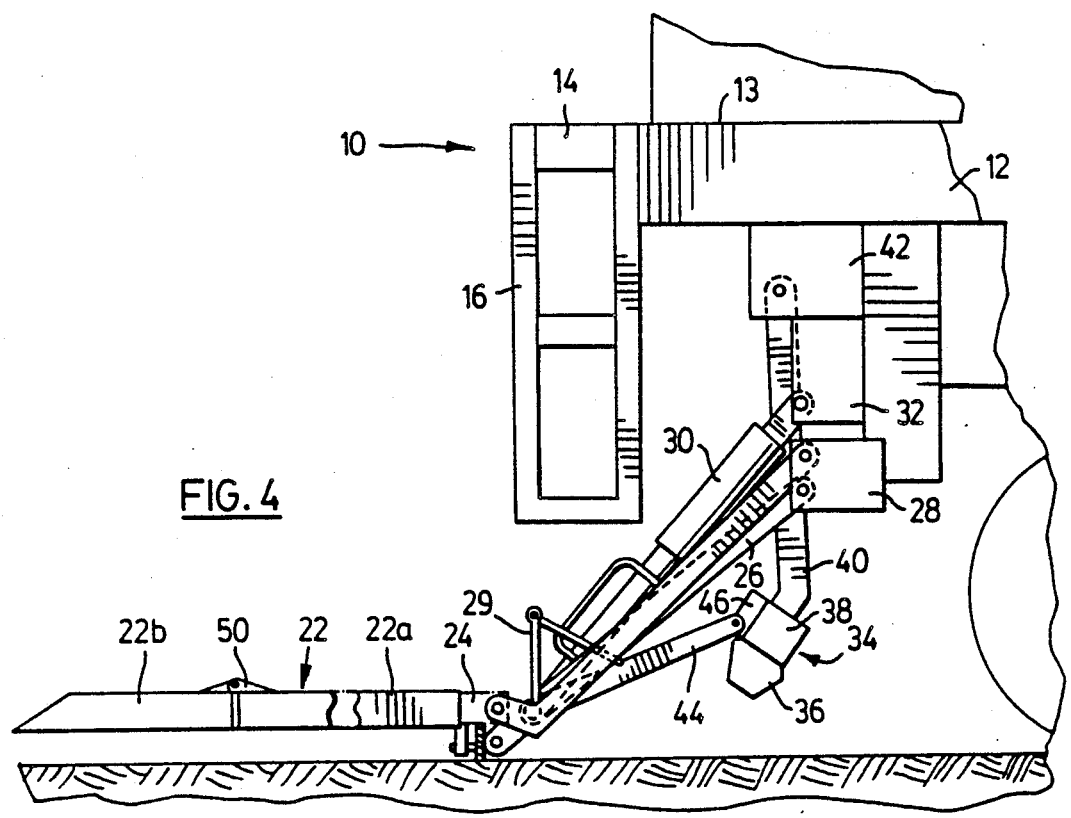
FIG. 4 is a view again similar to FIG. 2 showing the tailgate in a fully lowered operating position and the bumper fully retracted; and, FIG. 5 is another view similar to FIG. 4 showing the position of the bumper when the tailgate is in a raised operating position.
Figure 5:
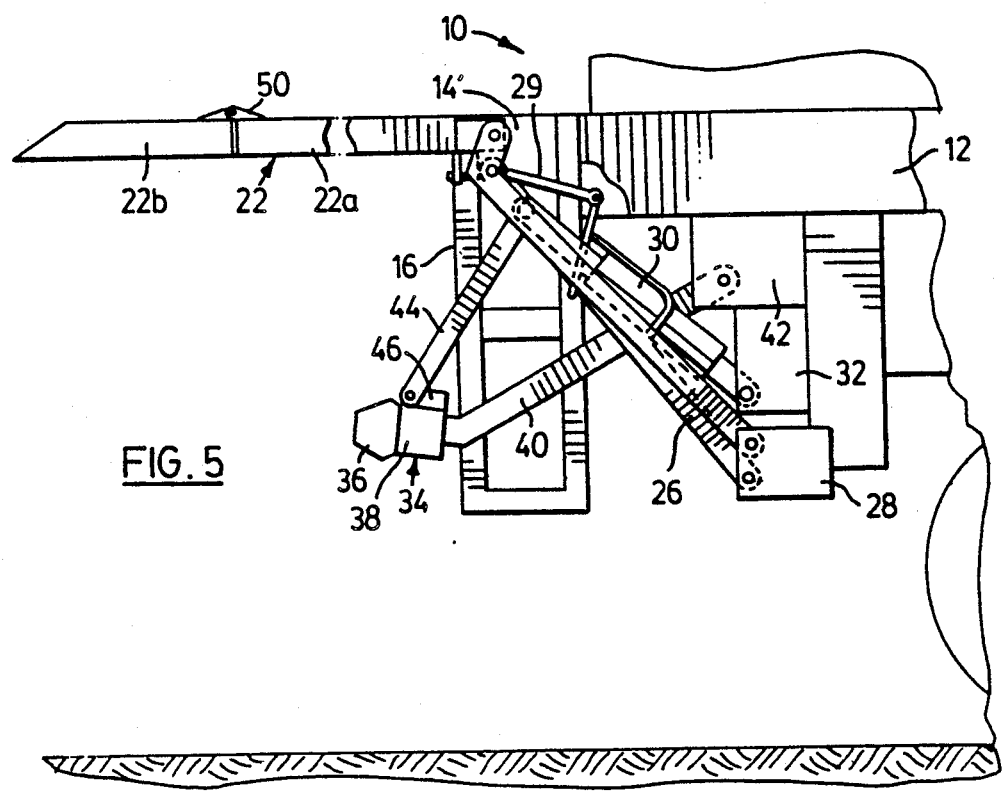

When the motor vehicle is stationary the operator of vehicle 10 employs tailgate assembly 18 to raise objects to the flatbed 13 of vehicle 10 by acuating hydraulic cylinder 30 to pivot platform 22 rearwardly and downwardly as shown in FIG. 3 until it reaches the position shown in FIG. 4 and also shown in FIG. 1. As platform 20 is moved in this manner, bumper bar 34 swings downwardly and beneath frame 12, out of its operative position and into a zone where it will not interfere with the function of tailgate assembly 18.

When objects have been loaded into platform 22 the platform is raised by the action of pneumatic cylinder 30 to a position that is level with flatbed 13 of vehicle 10, and the objects are then transferred from the platform to the flatbed. Objects may be unloaded from flatbed 13 by reversing this procedure. When the objects have been loaded, platform 22 is moved back to the position shown in FIG. 4, section 22b of the platform is folded onto 22a and the platform is then returned to the stored position of FIG. 2. This storing movement of tailgate assembly 18 swings bumper bar 34 back into its operative position as shown in FIG. 2.

The invention will work with types of tailgate systems other that shown in the example embodiment.

I claim:

1. For use with a tailgate assembly on a motor vehicle frame, a bumper assembly comprising:

a bumper bar carrying a pair of laterally projecting, spaced arms, one end of each of the arms being fixed to the bumper bar and the other end adapted to be pivotally mounted on the frame of the vehicle; and, rigid bar linkage means connected at one end with the bumper bar and adapted to be connected at the other end with the tailgate assembly, whereby upon lowering the tailgate said links urge the bumper bar to swing out of the path of the tailgate into a position suspended beneath the frame and spaced above ground.

2. In a motor vehicle having a frame with a tailgate assembly pivotally mounted thereon:

a bumper assembly comprising a bumper bar, a pair of spaced arms connecting the bar pivotally with the frame, and rigid bar linkage means interconnecting the bumper bar with the tailgate assembly whereby on lowering the tailgate assembly the bumper bar swings out of the path of the tailgate assembly and into a position suspended beneath the frame and spaced above ground.

3. A bumper assembly as claimed in claim 2, wherein the arms are each fixed at one end to the bar and at the other end pivotally to the frame.

4. A bumper assembly as claimed in claim 3 in which the tailgate assembly comprises a platform, a hydraulic cylinder and a plurality of shafts, the cylinder and shafts being pivotally attached to the platform and to the frame of the vehicle, the arms of the bumper assembly being positioned laterally outwardly from the cylinder and shafts of the tailgate assembly.

5. A bumper assembly, as claimed in claim 2, wherein the rigid bar linkage means comprises a pair of spaced links each pivotally connected at one end to the bumper bar and at the other end to the tailgate assembly.

6. In a motor vehicle;

a frame;

a tailgate assembly comprising a platform, a hydraulic cylinder and a plurality of shafts, the cylinder and shafts being pivotally attached to the platform and to the frame of the vehicle;

a bumper assembly comprising a bumper bar, a pair of spaced arms connecting the bar pivotally with the frame and positioned laterally outwardly from the cylinder and shafts of the tailgate assembly, and a pair of spaced rigid linkage bars each pivotally connected at one end to the bumper bar and at the other end to the tailgate assembly;

whereby on lowering the tailgate assembly said rigid linkage bars urge the bumper bar to swing out of the path of the tailgate assembly into a position suspended beneath the frame and spaced above ground.

* * * * *